T. J. MARTIN.
WINDOW GLASS SILENCER.
APPLICATION FILED NOV. 10, 1920.
1,380,996.
Patented June 7, 1921.
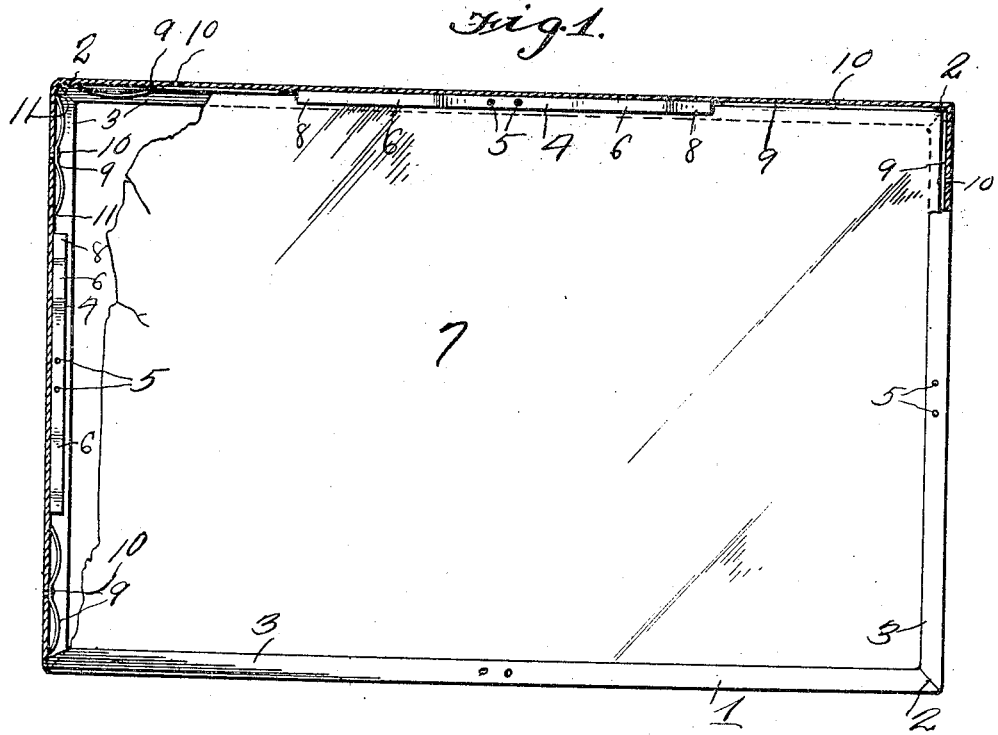
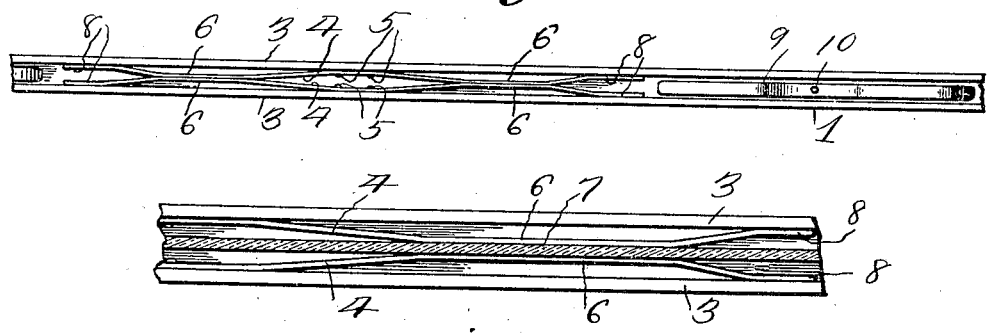
Inventor
T. J. Martin
By D. Swift
Attorney

UNITED STATES PATENT OFFICE.

TRUMAN J. MARTIN, OF ALLENTOWN, PENNSYLVANIA.

WINDOW-GLASS SILENCER.

1,380,996. Specification of Letters Patent. Patented June 7, 1921.

Application filed November 10, 1920. Serial No. 423,200.

*To all whom it may concern:*

Be it known that I, TRUMAN J. MARTIN, a citizen of the United States, residing at Allentown, in the county of Lehigh, State of Pennsylvania, have invented a new and useful Window-Glass Silencer; and I do hereby declare the following to be a full, clear, and exact description of the invention, such as will enable others skilled in the art to which it appertains to make and use the same.

The invention relates to window glass silencers and has for its object to provide leaf springs disposed within the window frame for engaging the sides of the window glass adjacent its ends for resiliently supporting the same, and also to provide leaf springs disposed within the bottom of a channel of the window frame and engaging the edges of the pane for additionally resiliently supporting the pane and preventing rattling thereof.

A further object is to provide a window glass frame having therein a channel for the reception of a glass, said channel having its sides provided with bowed leaf springs for engaging the sides of the glass adjacent its marginal edges for preventing rattling of the glass within the frame.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the window frame and glass, parts being broken away to show glass holding members.

Fig. 2 is a detail view of a portion of the window frame showing the position of the bowed springs therein.

Fig. 3 is an enlarged detail view showing a portion of the frame and looking into the channel, and showing a glass held between the bowed springs.

Referring to the drawings, the numeral 1 designates a rectangularly shaped window frame, which may be used in connection with automobiles, or in any place where a window is used. Frame 1 comprises side and end members U-shaped in cross section and secured together by welding or soldering or in any other suitable manner at the corners 2. Secured to the opposite flanges 3 of the U-shaped channel members are leaf springs 4, said leaf springs being riveted or otherwise secured to the flanges 3 by means of rivets 5. The leaf springs 4 beyond their securing points extend inwardly toward each other and terminate in flat engaging portions 6, which portions engage opposite sides of the window pane 7 adjacent its marginal edges, that is after the pane 7 has been forced between the flat portions 6 of the springs 4. The ends of said springs beyond the flat portions 6 extend outwardly and terminate in straight portions 8 which engage the inner faces of the flanges 3 of the channels thereby allowing the glass 7 when forced between the straight portions 6 to cause the springs 4 to flex and consequently allow the springs to resiliently hold the marginal edges of the glass for preventing rattling of the same. It has been found that where the glass is used on a moving vehicle, such for instance as in the windshield of an automobile that rattle to a certain degree develops on lateral movement of the glass within the frame. To overcome this difficulty leaf springs 9 are secured in the bottoms of the channel, preferably by means of rivets 10. The leaf springs 9 are double bowed springs and extend outwardly and inwardly and having their ends in sliding engagement with the bottoms of the channel as at 11. When the glass is placed in position the springs 9 are flattened and allowed to exert their spring action on the marginal edges of the glass 7 thereby preventing rattling of the glass incident to lateral movement within the frame 1.

From the above it will be seen that an anti-rattling device is provided which will prevent rattling of the glass within a frame, and one wherein the glass will not become loose incident to wear of the frame channel, or incident to wear and deterioration of felt which is now commonly used as a lining for the channels of glasses used in vehicles, and which quickly deteriorates and allows vibration and rattling of the glass.

The invention having been set forth what is claimed as new and useful is:—

The combination with a channeled window frame having a glass disposed therein, of oppositely disposed bowed leaf springs secured to the sides of the channel, said leaf springs being centrally secured to the channel and extending outwardly on each side of the securing points and merging in flat engaging portions for engaging the glass and then extending outwardly from each other and merging into flat portions for engaging the sides of the channel.

In testimony whereof I have signed my name to this specification in the presence of two subscribing witnesses.

TRUMAN J. MARTIN.

Witnesses:
MINNIE H. BECKER,
FRANK P. SCHANTZ.